United States Patent [19]

Matsumoto et al.

[11] 4,359,657
[45] Nov. 16, 1982

[54] ROTATION SPEED SIGNAL DETECTOR

[75] Inventors: Hisayuki Matsumoto; Seiichi Ushijima, both of Hirakata; Susumu Kinoshita, Katano; Masaki Suzuki, Hirakata, all of Japan

[73] Assignee: Matsushita Electric Industrial Co., Ltd., Osaka, Japan

[21] Appl. No.: 153,939

[22] Filed: May 28, 1980

[30] Foreign Application Priority Data

Jun. 4, 1979 [JP] Japan ................................. 54/70319

[51] Int. Cl.³ .......................................... H02K 13/00
[52] U.S. Cl. .................................... 310/156; 310/71; 310/113; 324/174; 324/208
[58] Field of Search ................ 310/156, DIG. 6, 207, 310/168, 40 MM, 49 A, 67, 68, 171, 71, 113; 324/166, 173, 174, 208; 73/518; 340/870.32, 870.35; 336/120, 129

[56]     References Cited
         U.S. PATENT DOCUMENTS 3,040,226  6/1962  Williams et al. .................... 336/120
3,148,347  9/1964  Morrison ........................ 340/870.32
3,208,269  9/1965  Eccles et al. ........................ 324/208
3,860,843  1/1975  Kawasaki et al. ................... 310/156
4,223,300  9/1980  Wiklund .............................. 324/208
4,260,920  4/1981  Nakamura et al. ................. 310/156
4,302,692  11/1981 Matsumoto et al. ................ 310/146

Primary Examiner—J. D. Miller
Assistant Examiner—D. L. Rebsch
Attorney, Agent, or Firm—Spencer & Kaye

[57]        ABSTRACT

A rotation speed signal detector comprising a cylindrical rotor magnet having n rotor magnet poles provided along the inner circumference and m[m>n] rotation speed detection magnet poles provided along the outer circumference; a stator winding; a rotation speed detection coil including a pair of coil conductors provided on the outer side of the rotor magnet in the form of a ring; and a terminal base having output terminal pins connected to one end portion of the coil conductors and a short circuiting terminal pin for connecting the other ends of the coil conductors. Each conductor may be short-circuited by a conductor on a winding conductor processing substrate provided separately instead of being short-circuited by the terminal pin.

5 Claims, 12 Drawing Figures

ROTATION SPEED SIGNAL DETECTOR

BACKGROUND OF THE INVENTION

The invention relates to a rotation speed signal detector for a motor with a permanent magnet rotor. The object of this invention is to provide an extremely simple and economical rotation speed signal detector, in which an array of magnet poles on the inner circumferential surface of a cylindrical permanent magnet is used to generate a rotation torque while an array of magnet poles on the outer circumferential surface of the cylinder is used to detect the rotation speed signal.

SUMMARY OF THE INVENTION

According to the invention, there is provided a rotation speed signal detector comprising a cylindrical rotor magnet having an array of n magnetic poles magnetized on the inner circumferential surface of the cylinder along the peripheral direction and an array of m (m>n) magnetic poles magnetized on the outer circumferential surface of the cylinder along the peripheral direction; a stator fixed opposite the array of n magnetic poles of the rotor magnet and having a stator winding for giving a rotational force to the rotor magnet; a detection coil provided with coil conductors having winding elements at angular positions corresponding to magnetic pole pitches of m poles of the rotor magnet and connecting the winding elements in a wave form for detection, the electric phase difference of the coil conductors on the both surfaces of a flexible insulating sheet being made $\pi$; a supporting member for supporting the detection coil in a ring form such that the detection coil lies around the array of m poles of the rotor magnet and such that the peripheral surface of the detection coil is opposite to the array of m poles of the rotor magnet with a prescribed gap therebetween; and pin terminal means having terminal pins connected to one-side pair of the terminal conductor portions of the detection coil to lead out a rotation speed signal of the detection coil, while the other-side terminal pair of conductor portions of the detection coil are electrically connected to form a short-circuit whereby the rotation speed signal of the rotor magnet is derived from the pin terminal means.

BRIEF DESCRIPTION OF THE DRAWINGS

Further objects, features and advantages of the present invention will be described with reference to the following accompanying drawings.

DESCRIPTION OF THE PREFERRED EMBODIMENTS

Figure 1:
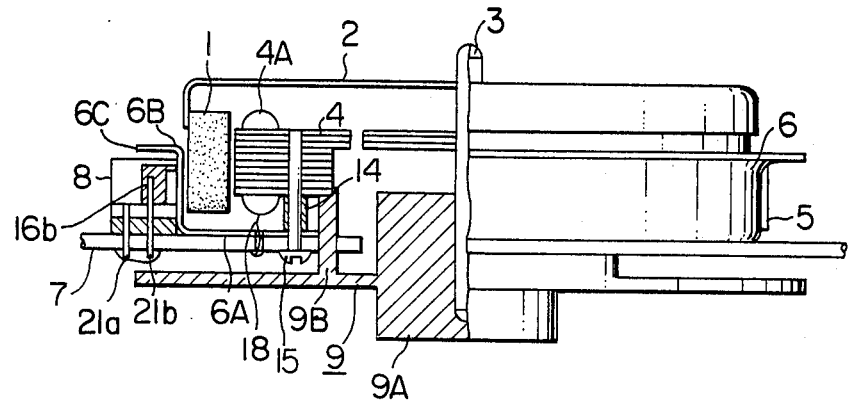
FIG. 1 shows the front view of a rotation speed signal detector according to one embodiment of this invention, including a sectional view of the main part.
Figure 2:
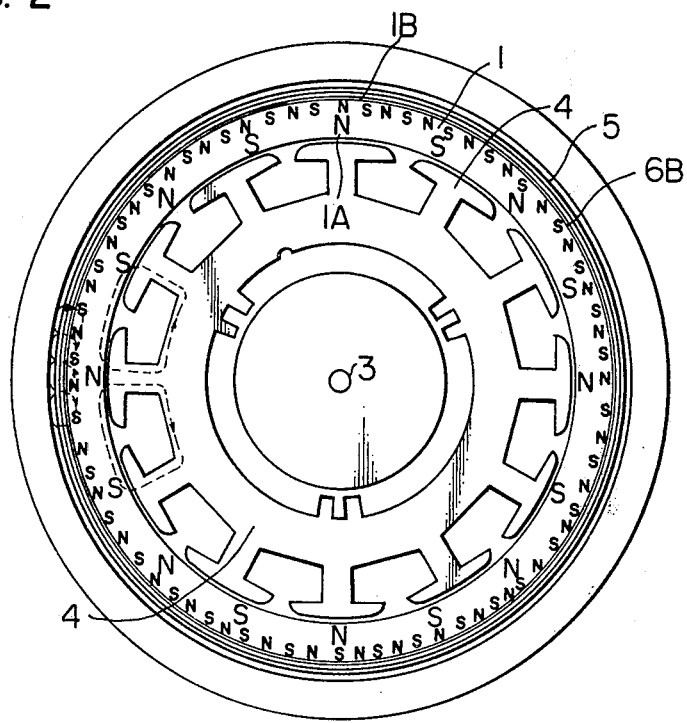
FIG. 2 is a planar cross-sectional view of the main part of the detector.
Figure 3A:
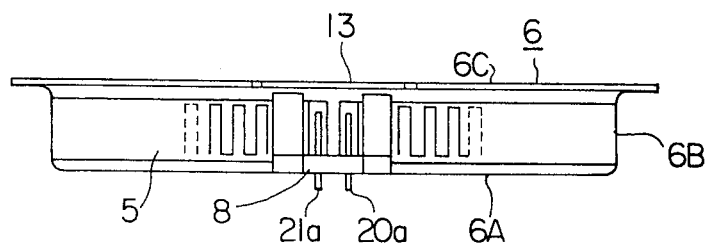
FIG. 3a is a front view of a support member used for the detector.
Figure 3B:
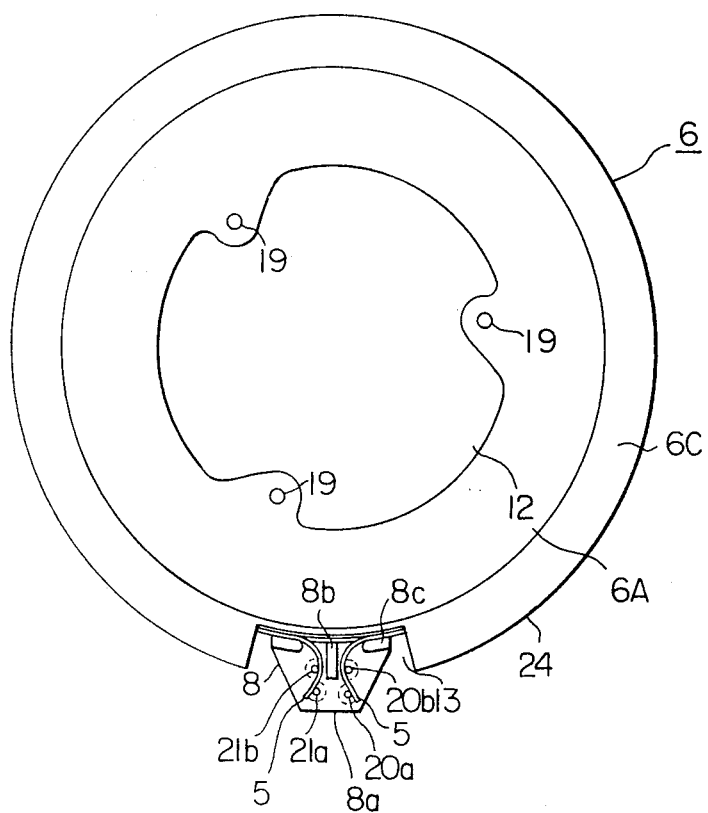
FIG. 3b is a planar view of the support member.

In FIGS. 1 to 5 showing one embodiment of this invention, the reference numeral 1 denotes a cylindrical rotor magnet made of an isotropic magnetic material. On the inner circumferential surface, an array 1A of n magnetic poles are provided along the circumference while on the outer circumferential surface an array 1B of m magnetic poles (m>n) are provided along the circumference, as shown in FIG. 2. The numeral 2 denotes a magnet supporting member on which the rotor magnet 1 is mounted. 3 denotes a rotary shaft to which the magnet supporting member 2 is fixed. The rotor magnet 1 is rotatably supported by the rotary shaft 3, since the shaft 3 is rotatably mounted on the bearing stand 9A of a supporting base 9. 4 denotes a stator fixed to the stator mounting portion 9B of the supporting base 9. The stator 4 is disposed opposite to the array of n number of the magnetic poles of the rotor magnet 1. The stator 4 has a winding 4A which acts on the array 1A of n magnetic poles of the rotor magnet to give a rotational force thereto. 5 denotes a ring type detection coil disposed opposite to the array 1B of m magnetic poles with a constant interval therefrom. The coil 5 has detection winding elements at anglar positions corresponding to a pitch of m magnetic poles. As shown in FIGS. 4a and 4c, a square wave type conducting pattern 16 is provided on one surface of a band type flexible insulating sheet 10 as a detection winding element, while the other square wave type conducting pattern 17 is provided on the other surface of the sheet 10 as the other detection winding element. On each side one end of each of the patterns 16 and 17 form output terminals 16a and 17a while the other ends of the patterns form short-circuit terminals. The detection coil 5 is manufactured either by forming conducting patterns 16 and 17 on the insulating sheet using the etching method or by forming them using a die stamping method. 6 denotes a supporting member for the detection coil 5 for supporting the coil 5 in the form of a ring with a constant gap with respect to the array 1B of m magnetic poles of the rotor magnet 1. The supporting member 6 is mounted coaxially with the rotary shaft 3. The detection coil 5 is adhered by a double surface adhesive tape 11 to the outer periphery of the ring portion 6B for constructing a supporting member 6 to maintain a ring shape disposed opposite to the array of m magnetic poles of the rotor magnet 1 with a constant gap therefrom. The supporting member 6 is also formed in the shape of a cup with a bottom by an aluminium drawing process, as shown in FIG. 3a. On the surface portion of the bottom 6A, an escape hole 12 for the stand 9A and the mounting portion 9B of the supporting base 9 is provided. In the peripheral portion 6C of the cup, a cut-off portion 13 for exposing and taking out both ends of the detection coil 5, which are fixed to the outer periphery of the ring 6B, is formed. 7 denotes a wiring or winding-conductor processing substrate fixed to the stator 4 by screw 15 with a spacer 14 therebetween. A lead wire 18 for the stator winding 4A is soldered to the substrate. The supporting member 6 is fixed to the stator 4 coaxially with the rotary shaft 3 by inserting the screw 15 into screw holes 19 and binding them together. 8 denotes a terminal base mounted at the cut portion 13 of the supporting member 6 of the wiring processing substrate 7. Terminal pins 20a, 20b and 21a, 21b are soldered to a conductor layer of the winding-conductor processing substrate 7. The terminal base 8 has a main body part 8a in which the terminal pins 20a, 20b, 21a, and 21b are buried, a partition plate portion 8b for separating the terminal pins 20a, 20b and 21a, 21b, and a contact plate portion 8c, in which a cut portion 22 for taking out both ends of the detection coil 5 supported by the supporting member 6 is formed.

Figure 4A:
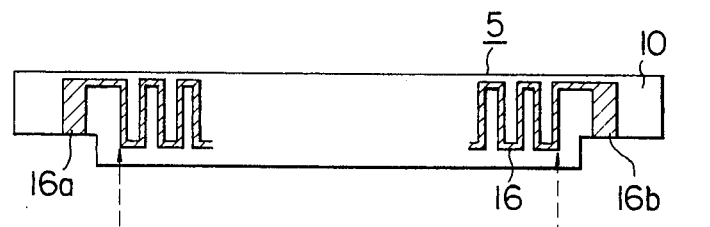
FIG. 4a is a front view of the one side of an insulating sheet of a detecting coil used for the detector.
Figure 4B:
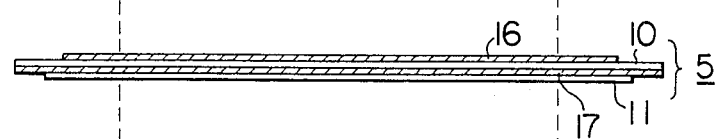
FIG. 4b is a cross-sectional view of each detecting coil.
Figure 4C:
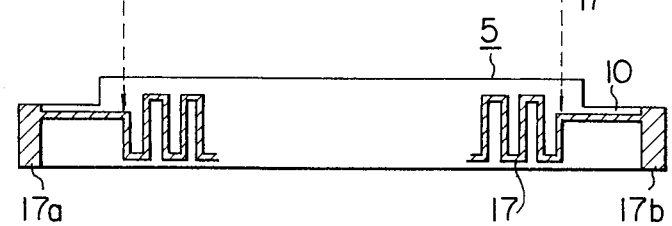
FIG. 4c is a rear side view of the insulating sheet.

Here, as shown in FIGS. 4a to 4c, the detection coil 5 is provided on both surfaces of a flexible band shaped insulating sheet 10 (which is usually made of polyester or polyimide) and a particular structure is made to easily obtain a signal output. That is, 16 is the upper surface conducting pattern, while 17 is the lower surface conducting pattern, both patterns being formed to have no pitch difference between the coils as shown by dotted arrows. The patterns in FIGS. 4a to 4c are arranged such that when the magnet array 1B on the outer periphery of the rotor magnet 1 and the detection coils 5 are positioned opposite each other, the signal voltages generated at both terminal parts of each coil have an electrical angular phase difference of $\pi$. The detection coil 5 is thus fixed on the outer periphery of the ring portion 6B of the supporting member 6 by the two-surface adhesive tape 11, which serves to insulate the coil conductor from the supporting member 6 when it is made of metal. The tape may be preliminarily placed on the outer periphery of the ring 6B of the supporting member 6 rather than on the coil 5 itself. Furthermore, the terminal portions on both sides of the detection coil are connected to the terminal base 8 mounting the terminal pins 20a, 20b and 21a, 21b. On the terminal base 8, a pair of terminal parts on one side of the detection coil 5 are connected with a pair of terminal parts on the other side of the coil 5 by plural terminal pins 20a, 20b, 21a and 21b in such a manner that the one pair of terminal pins is connected electrically to form a short circuit while the other pair of terminal pins are led out without connection to form an output circuit. More specifically, the one-side ends of the detection coil 5 are fixed between the terminal pins 20a and 20b on the terminal base 8 in the form of the character S, and the output terminals 16a and 17a on the top and rear surface sides are soldered to the terminal pins 20a and 20b to form an output circuit. Furthermore, the other ends of the detection coil 5 are fixed between the terminal pins 21a and 21b on the terminal base 8 in the form of an inverted S such that short-circuiting terminals 16b and 17b on the front and rear surface sides are soldered to the terminal pins 21a and 21b. The terminal pins 21a and 21b are connected with each other by a conducting foil on the winding-conductor processing substrate 7 to form a short-circuit.

Figure 5:
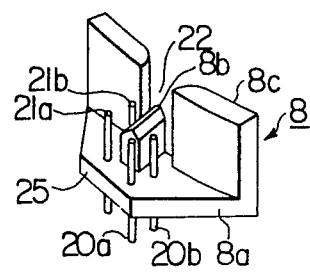
FIG. 5 is a perspective view of the structure of a terminal base used in the detector.
Figure 6:
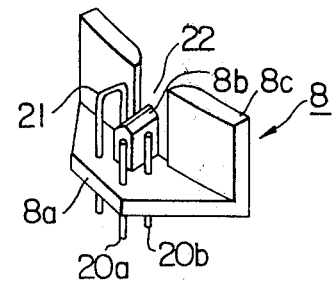
FIG. 6 is a perspective view of the structure of another terminal base used in the detector.
Figure 7A:
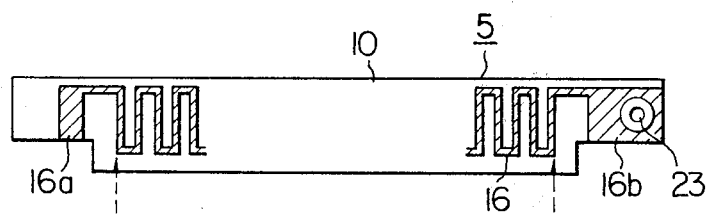
FIG. 7a is a planar view of the structure of another detecting coil used for the detector.
Figure 7B:
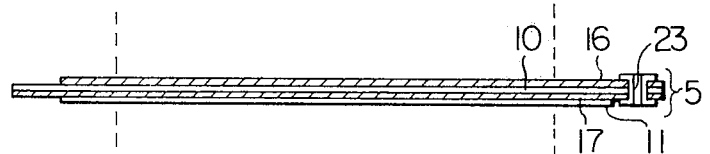
FIG. 7b is a cross-sectional view of the above structure.
Figure 7C:
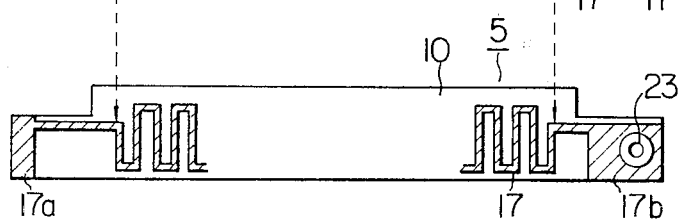
FIG. 7c is a bottom side view of the above structure.

As another method for short-circuiting the terminals 16b and 17b, a terminal pin 21 may be provided on the terminal base 8 already in a short-circuited state, as shown in FIG. 6. Namely, it is sufficient if the front and rear surface coil conductors at the terminal parts of the detection coil 5 are short-circuited through a pin. The terminal base 8 may be prepared in the form of a component in one united body where the pin terminal group is fixed, as shown in FIG. 5. The base 8 can be easily made of a mold of an insulating material such as resin. The winding-conductor processing substrate 7 has the functions of short-circuiting the pin terminals 21a and 21b as well as mechanically fixing the pin terminal group by solder for transmitting a rotation speed signal appearing between the pin terminals 20a and 20b to the stator side and control the rotation speed of the rotor magnet 1. The pin terminals 20a, 20b, 21a, and 21b may be provided preliminarily in the winding-conductor processing substrate 7 so that they may be respectively connected directly to the terminal portion of the detecting coil 5. The magnetic flux necessary for generating a rotational force of the rotor magnet forms a circular path which starts from a magnetic pole N of the n poles magnetized on the inner periphery of the rotor magnet 1 in the direction of the pole N→air gap→protruding part of the stator→stator→protruding part of the stator-→air gap→pole S→pole N. Similarly, the magnetic flux necessary for generating a rotation speed signal of the rotor magnet 1 forms a circular path which starts from a magnetic pole N of the m poles magnetized on the outer periphery of the rotor magnet 1 in the direction of the pole N→air gap→supporting ring→detection coil-→air gap→pole S.

The rotation speed signal detector with the above mentioned structure has following advantages.

(1) No extra rotor is necessary to detect the rotation speed signal, because the magnetic flux of the n poles on the one peripheral surface of the cylinder of the rotor magnet 1 is used to generate a rotational force while the magnetic flux of the m poles on the other peripheral surface of the cylinder is used to generate a speed signal. Namely, the magnet which is expensive among the construction materials of this type is in common use. Therefore, the rotation speed signal detector has a simple structure and is very economical.

(2) For the detection of the rotation speed signal the rotor magnet 1 is magnetized in the diametrical direction (the outer periphery in the case of this embodiment). So, the detection coil may be disposed merely in the diametrical direction. In the mass production of detectors of this kind, only if the outer and inner peripheral surfaces of the rotor magnet 1 are polished to a prescribed precision, can eccentricity or deviation of both peripheral surfaces be reduced to a rather small value. Both the supporting member 6 and the detection coil 5 can be placed close to the rotor magnet 1, so that unfavorable fluctuation or nonuniformity of the detection signal can be limited within a small value even after mass production of these detectors.

(3) The detection coil 5 is supported by the ring portion 6B of the supporting member 6 with the periphery thereof opposite to the rotor magnet 1. This construction allows the material of the supporting member to be nonmagnetic. Usually, it is made of a thin molded resin or thin metal plate worked by a drawing process. Especially, copper and aluminium plates, being made extremely thin with a strong structure and also being economical, are cheap and useful as the constituent material of this type. Here, the detector of this embodiment has such a shape that a certain shielding effect of the ring portion 6B of the supporting member 6 to obtain an electric output may occur against the electromagnetic phenomenon utilized. However, since the required detection frequency ranges from a few to several hundred Hz, use of a metal material such as copper and aluminium is very practical in increasing the precision of the structure. When a metal is used for the supporting member 6 as mentioned above, interference by relatively high frequency noise (higher than a few KHz)

which might otherwise enter from the exterior can be avoided. The metal material on the periphery of the ring 6B gives an eddy current loss to such relatively high frequency noise. Thus, this structure is highly resistive against high frequency induction or electromagnetic interference through space.

(4) A source of magnetic flux for the detection signal lies on the side of the outer periphery of the rotor magnet 1. So, the value of "m" can be made much larger than the value of pole number "n" of the flux source which is necessary for the generation of a rotational force. The construction presented in this embodiment with n=16 and m=72 is a mere example for easy understanding. The number "m", which is determined by the outside diameter D of the rotor magnet 1 and the minimum width of a magnetic pole of the magnetized means, etc., can be made 200 to 500 (m≈200~500) even in the case when the rotor magnet has an outer diameter of 90 to 100 mm. Since the output frequency of the rotation speed signal can be made high, the ripple frequency of the stator winding current, if it is controlled by using the output signal, can also be made high. The gain of the speed control feedback system can be increased. Therefore, the variation of the rotation speed due to the variation of load torque can be reduced. Furthermore, the response characteristic of the speed control system to a load variation due an external disturbance or the rising characteristic at the start can be greatly improved.

(5) The detection coil 5 has conductor patterns 16 and 17 on both surfaces thereof. The rotation speed signal voltage $E_1$ obtained by the front surface conductor 16 of the detection coil 5 due to the rotation of the rotor magnet 1 is given by $$E_1 = E_m + E_n, \quad (1)$$

where $E_m$ is a voltage obtained by detection of the speed of the magnets magnetized on the outer periphery of the rotor magnet 1 and $E_n$ is the voltage due to a noise component.

Similarly, the rotation speed signal voltage $E_2$ obtained by the rear surface coil conductor 17 is given by $$E_2 = -E_m + E_n, \quad (2)$$

due to the electric phase difference $\pi$ with respect to $E_1$. Since the terminal surfaces on the one side of the upper and lower coil conductors of the detection coil 5 are connected with each other while the terminal surfaces on the other side of the coil conductors form output terminals, the resulting output voltage E is given by the difference between $E_1$ and $E_2$.

$$E = E_1 - E_2 = (E_m + E_n) - (-E_m + E_n) = 2E_m \quad (3)$$

Thus, only the voltage related to the magnetic flux of the m poles of the rotor magnet 1 appears as the doubled output while all the other voltages are cancelled. The two-surface detection coil is a perfectly inductionless coil which yields only the necessary signal.

Therefore, according to this embodiment, (6) A highly efficient rotation speed signal detector having an extremely high signal to noise ratio can be obtained, which favors the design of an amplifier for the rotation speed signal voltage and further makes the control of the rotation speed of the rotor magnet 1 very effective.

(7) Since the coil conductors are formed on both surfaces of a flexible insulating sheet and fixed by adhesive to the periphery of the support member ring, and further the coil conductors can be made extremely thin by using the print wiring technique, the detection coil 5 may be very close to the m poles, making effective use of the magnetic field lines from the m poles. Generally a detector of this type requires that the number of poles m and hence the output signal be increased as much as possible, and, therefore the above-mentioned construction meets these requirements well.

(8) In the structure mentioned in (7), the short-circuiting of the one end terminal portion of the front and rear surface conductors of the detection coil 5 is made by provision of extra pin terminals. This makes it possible to supply components for the two-surface detection coil without providing a connection between the front and rear surface patterns. Usually, the step of connecting conductors on the front (upper) and rear (lower) surfaces results increased cost even when instead of a flexible plate a hard type print wiring plate is used (through hole plating is usually employed), and a problem of utility arises due to a lack of reliability. According to this embodiment, such a defect is totally removed, the two-surface detection coil 5 is produced very cheaply and its application to a rotation speed signal detector of this type is achieved. The fact that the detection coil 5 functions as a two-fold winding, although the fabrication is exactly the same as that of a one-fold winding, makes mass production convenient.

If the feature mentioned in the above paragraph (8) is not used, it is needless to say that the short-circuit terminals 16b and 17b of the detection coil 5 may be connected by a through hole conductor 23. In this case, the terminals 16b and 17b may be left as free ends, or may be fixed mechanically by a pin terminal on the terminal base 8.

As described above, according to this invention, a two-surface detection coil is made by using the print wiring method and, moreover, the front and rear surface conductors are connected in a sophisticated way, whereby a perfectly inductionless coil which excludes totally interference noise other than the rotation speed signal is cheaply fabricated. Merits of the invention concerning the structure of a rotation speed signal detector are; a high signal to noise ratio in the output signal, inexpensive fabrication of the components together with a capability of efficient signal detection, and a high mass producibility.

What is claimed is:

1. A rotation speed signal detector comprising:
   a cylindrical rotor magnet having an array of n magnetic poles magnetized on one circumferential surface of said cylinder along the peripheral direction and an array of m (m>n) magnetic poles magnetized on the other circumferential surface of said cylinder along the peripheral direction;
   a stator fixed opposite to said array of n magnetic poles of said rotor magnet and having a stator winding for giving a rotational force to said rotor magnet;
   a detection coil provided with first and second sets of coil conductors mounted on first and second sides of a flexible insulating sheet, said coil conductors having winding elements at angular positions corresponding to magnetic pole pitches of m poles of said rotor magnet and being connected as a wave winding, the electric phase difference between said first and second sets of coil conductors being equal to $\pi$;

a supporting member for supporting said detection coil in a ring form, said detection coil being positioned around said array of m poles of said rotor magnet with the peripheral surface thereof opposite said array of m poles of said rotor magnet with a prescribed gap therebetween;

a terminal base having a main body and a pair of spaced apart contact plates;

a winding-conductor processing substrate attached to said stator, said substrate having an output circuit for producing a rotational speed signal; and terminal pin means including first and second pairs of terminal pins embedded in the main body of said terminal base, one end of each of the coil conductors of said detection coil comprising said first and second sets of coil conductors being connected to respective terminal pins of said first pair of terminal pin means in the form of the letter S, and the other ends of said coil conductors being connected to respective terminal pins of said second pair of terminal pin means in the form of an inverted letter S, the ends of said detection coil being passed between the spaced apart contact plates of said terminal base, and the respective terminal pins of said second pair of terminal pins being electrically connected to each other.

2. A rotation speed signal detector according to claim 1 wherein said winding-conductor processing substrate includes a conductive layer, and wherein said conductive layer electrically connects the pins of said second pair of terminal pins to each other.

3. A rotation speed signal detector according to claim 1 wherein the pairs of said second pair of terminal pins are connected together by a conductive element forming a part thereof.

4. A rotation speed signal detector according to claim 1 which further comprises a two-surface adhesive tape and wherein said supporting member includes a ring portion, said detection coil being secured to the outer periphery of the ring portion of said supporting member by said adhesive tape.

5. A rotational speed signal detector according to claim 1 wherein said terminal base further comprises a partition plate for separating said first pair of terminal pins from said second pair of terminal pins.

* * * * *